United States Patent [19]

Tieszen

[11] 4,212,922

[45] Jul. 15, 1980

[54] POLY(ARYLENE SULFIDE) RESIN COATING

[75] Inventor: Dale O. Tieszen, Bartlesville, Okla.

[73] Assignee: Phillips Petroleum Company, Bartlesville, Okla.

[21] Appl. No.: 947,804

[22] Filed: Oct. 2, 1978

[51] Int. Cl.² .................... B32B 27/28; B32B 15/18; B32B 27/08

[52] U.S. Cl. .................... 428/419; 427/195; 427/203; 427/205; 427/318; 427/385.5; 427/327; 427/409; 428/336; 428/339; 428/461; 428/472

[58] Field of Search ............... 427/195, 202, 203, 318, 427/201, 205, 327, 385 R, 409; 428/457, 461, 469, 419, 472, 336, 339

[56] References Cited

U.S. PATENT DOCUMENTS

| | | | |
|---|---|---|---|
| 2,990,294 | 6/1961 | Long | 428/339 |
| 3,368,928 | 2/1968 | Chadha et al. | 428/472 X |
| 3,622,376 | 11/1971 | Tieszen et al. | 428/419 |
| 3,634,125 | 1/1972 | Tieszen | 427/223 |
| 3,652,327 | 3/1972 | Hill et al. | 428/451 |
| 3,856,736 | 12/1974 | Tieszen et al. | 260/29.6 F |
| 3,988,286 | 10/1976 | Edmonds et al. | 428/419 X |
| 4,012,539 | 3/1977 | Davies | 427/195 |
| 4,086,376 | 4/1978 | Davies | 428/419 X |
| 4,132,823 | 1/1979 | Blackwell et al. | 428/419 X |
| 4,138,526 | 2/1979 | Borresen et al. | 428/419 |
| 4,145,326 | 3/1979 | Blackwell | 428/461 X |
| 4,156,049 | 5/1979 | Hodes et al. | 428/419 X |

FOREIGN PATENT DOCUMENTS 1475295 6/1977 United Kingdom .

Primary Examiner—Harold Ansher

[57] ABSTRACT

The adhesion of poly(arylene sulfide) coatings to metal substrates is improved by incorporating an effective amount of finely divided manganese dioxide into a poly(arylene sulfide) primer coat to prime the metal substrate. The primer coat can subsequently be coated with a poly(arylene sulfide) coating or with any other suitable finish coating which will adhere to the primer coat.

14 Claims, No Drawings

POLY(ARYLENE SULFIDE) RESIN COATING

This invention relates to arylene sulfide polymer coatings exhibiting improved adhesion to metal substrates. In another aspect, the invention relates to coating metal substrates with a poly(arylene sulfide) composition. In still another aspect, the invention relates to the poly(arylene sulfide) primer coating for metal substrates. In yet another aspect, the invention relates to a composition for coating a metal substrate. In accordance with another aspect, this invention relates to metal-containing substrates coated with superposed layers of at least one layer of a poly(arylene sulfide) containing finely divided manganese dioxide and at least one layer of poly(arylene sulfide) resin. In accordance with still another aspect, this invention relates to iron-containing substrates coated with poly(phenylene sulfide) wherein an aromatic sulfide polymer containing finely divided manganese dioxide is applied as a primer to the iron-containing substrate prior to application of the poly(phenylene sulfide) coating to improve the adhesion of the poly(phenylene sulfide) to the iron substrate.

Phenylene sulfide polymers are known to be useful as coatings for metal substrates, including iron substrates. However, the bond between the arylene sulfide polymer coating and a substrate which is made of iron is not as strong as would be preferred, and conventional methods for improving adhesion of a polymer coating to a metal substrate, e.g., treatment of a substrate by degreasing with a solvent, cleaning with an acid or gritblasting, do not provide the degree of adhesion desired for some applications.

Accordingly, an object of this invention is to provide a coating for metal substrates.

Another object of this invention, is to provide for coating metal substrates with a poly(arylene material).

Still another object of this invention is to provide for coating of a metal substrate with a poly(arylene sulfide) primer coat.

Another object of the invention is to provide a composition for coating metal substrates.

Another object of the invention is to provide metal substrates having a poly(arylene sulfide) composition coated thereon.

A further object of the invention is to improve the adherence of a poly(arylene sulfide) coating to a metal substrate.

Other objects, aspects and the several advantages of this invention will be apparent to those skilled in the art upon the study of the specification and the appended claims.

In accordance with the invention, a suitable poly(arylene sulfide) material is combined with an effective amount of manganese dioxide for improving the adhesion of the poly(arylene sulfide) to a metal substrate.

In actual operation and in a preferred embodiment finely divided poly(arylene sulfide) resin and manganese dioxide are combined and the resulting mixture is then applied as a coating onto a metal substrate especially iron-containing substrates and the poly(arylene sulfide) is then cured by heating. The coating thus applied can then be utilized as a primer coat for the metal substrate and a subsequent application of a suitable coating can be utilized to obtain a final coated substrate which has desirable properties on the external coating surfaces and improved adherence to the metal substrate.

The metal substrate can comprise any metal that is desired to be coated with poly(arylene sulfide) resin including aluminum, chromium, and titanium but preferably is an iron-containing substrate which generally comprises principally iron and can be pure iron or an alloy. By iron substrate in this invention is meant iron itself such as wrought iron, carbon steels, and iron alloys containing iron as the major component, e.g., stainless steel. The substrate can be in any shape desired. Thus, substrates in the form of wire, sheet, machined objects, forged objects, and the like are suitable for production of the laminates of this invention. Coupons have been demonstrated to be a suitable form of substrate. If desired, the substrate can be cleaned, gritblasted, treated with hydrochloric acid, or subjected to other conventional surface treatments prior to application of the primer coating in accordance with this invention.

The nature of the arylene sulfide polymer employed is not critical provided it is fusible and can be cured by heating to form a normally solid coating. The arylene sulfide polymer can be linear, branched, or lightly crosslinked. Although the arylene sulfide polymers presently preferred are linear, branched, or lightly crosslinked phenylene sulfide polymers, other arylene sulfide polymers such as linear, branched, or lightly crosslinked biphenylene sulfide polymers; linear, branched, or lightly crosslinked oxydiphenylene sulfide polymers; linear, branched, or lightly crosslinked sulfonyldiphenylene sulfide polymers; or the like, with or without lower alkyl substituents, can be employed. By "lower alkyl" is meant alkyl having one to about six carbon atoms such as methyl, ethyl, propyl, isobutyl, pentyl, hexyl, and the like. If desired, arylene sulfide copolymers containing recurring arylene sulfide units of two or more different structures, or blends of arylene sulfide polymers, can be used. Presently preferred polymes are poly(pneylene sulfide) polymers (PPS) which have melting temperatures ranging from about 500° to about 900° F. (288° to 482° C.).

Although the melt flow (ASTM D 1238-70, modified to a temperature of 316° C. using a 5-kg weight, value expressed as g/10 min) of the arylene sulfide polymer can vary over a wide range, generally it will be within the range of about 2,000 to about 12,000, preferably about 2,500 to about 6,000. Applicable arylene sulfide polymers can be produced, e.g., from polyhalo aromatic compounds, alkali metal sulfides, and organic amides, as described in U.S. Pat. No. 3,354,129, or from dihalobenzenes, alkali metal sulfides, organic amides, and alkali metal carboxylates, as described in U.S. Pat. No. 3,919,177. If desired, such polymers can be subjected to mild curing by heating to reduce the melt flow as described in U.S. Pat. No. 3,717,620 prior to use in the process of this invention.

The particle size of the polymer can vary rather widely from very fine powders to particles about 10 mesh (1.7 mm) in size. Good results can be obtained with polymers having a particle size ranging from about 40 to less than about 100 mesh (Standard U.S. Sieve Series, 0.4 to 1.1. mm) or finer.

The manganese dioxide is used in finely divided form preferably so that the primer coating after curing is smooth and even in appearance. Generally its particle size is of the same order of magnitude as the PPS powder.

The concentration of manganese dioxide to be combined with the poly(arylene sulfide) to achieve the desired improvement in adherence to a metal substrate can vary considerably. The amount of manganese dioxide contained in the compositions [weight of poly(arylene sulfide) plus manganese dioxide] can range from about 5 to about 70 weight percent and more preferably about 30 to about 60 weight percent. Mixing can be performed in any suitable manner, preferably by mixing together the powders of the two components to obtain a good dispersion. The mixing can be done in the absence or presence of a liquid diluent which is inert to the components and to the substrate and which is readily volatilized during the subsequent heating. Suitable diluents include ethylene glycol, propylene glycol, alcohols such as methanol and ethanol, hydrocarbons such as n-heptane, benzene, cyclohexane, and the like. Less preferred diluents include water, halogenated hydrocarbons such as chlorinated biphenyl, chlorobenzene, and the like, and esters such as dimethyl phthalate. Mixtures of diluents can be employed, if desired.

The manner in which the primer coating is applied to the metal substrate is not critical. For example, the primer can be applied by electrostatic spraying or other form of powder spraying, by fluidized bed techniques, or as a dispersion in a liquid, such as hexane or diethyl ether, in which the primer exhibits little solubility, followed by volatilization of the liquid. In a presently preferred method, the primer is applied as a dispersion in a liquid for the primer. Usually the primer in such slurries will constitute within the range of about 10 to about 60 weight percent, preferably about 25 to about 50 weight percent, solids of the slurry used. After application of the slurry to the substrate, the solvent is evaporated. Regardless of the method of application to the substrate, the primer on the substrate is heated at a temperature within the range of about 280° C. to about 450° C., preferably within the range of about 300° C. to about 400° C., for a period of time within the range of about one minute to about 90 minutes, preferably within the range of about two minutes to about 30 minutes, thereby curing the poly(arylene sulfide) resin. If desired, multiple application and curing of the primer can be used. Although the thickness of the resulting cured coating is not critical, generally it will be within the range of about 0.1 mil to about 5 mils. Thus, the amount of primer applied to the substrate, as one or more coatings, preferably is such as to provide a cured primer coating having a thickness within this range.

The arylene sulfide polymer or other suitable coating can be applied to the poly(arylene sulfide)-coated substrate by conventional methods. The second composition can be applied to the primed substrate in the manner used to apply the first composition. Following curing of the primer coat, the coated substrate is preferably cooled before a subsequent coating is applied. Examples of suitable methods of applying the second composition include electrostatic spraying or other form of powder spraying, fluidized bed techniques, or slurry techniques using a carrier liquid such as water, methyl alcohol, ethylene glycol, heptane, or the like. When the substrate is in a form such as sheet or wire, extrusion techniques can be used to apply the arylene sulfide polymer. If desired, substances such as other polymers e.g., poly(tetrafluoroethylene), and fillers and pigments, e.g., mica, silica, titanium dioxide, ferric oxide, cobaltic oxide, molybdenum disulfide, and the like, can be present in the arylene sulfide polymer. After removal of carrier liquid, if used, the arylene sulfide polymer on the poly(arylene sulfide)-manganese dioxide coated substrate is heated at a temperature within the range of about 280° C. to about 450° C., preferably within the range of about 330° C. to about 400° C., for a time within the range of about one minute to about five hourse, preferably within the range of about 15 minutes to about two hours, to cure the arylene sulfide polymer. If desired, multiple application and curing of the arylene sulfide polymer can be employed. Although the thickness of the resulting cured arylene sulfide polymer layer is not critical, generally it will be within the range of about one mil to about 30 mils. Therefore, the amount of the composition comprising arylene sulfide polymer applied to the coated substrate, as one or more coatings, preferably is such as to provide a cured arylene sulfide polymer layer having a thickness within this range.

EXAMPLE

A mixture consisting of 157 g PPS having a nominal melt flow of 3000 and a particle size of less than 60 mesh, 157 g of manganese dioxide having a particle size of less than 60 mesh and 400 g of propylene glycol was ball milled overnight at ambient conditions. The composition, after recovery, was sprayed onto flat, cold-rolled steel coupons $1 \times 4 \times 0.060$ inches ($2.5 \times 10 \times 0.15$ cm) and onto bullet-nosed steel slugs 0.5 inch in diameter and 4 inches long ($1.3 \times 10$ cm) at room temperature. The steel coupons and slugs were carbon steel identified as 1018, American Iron and Steel Institute. The steel specimens had previously been degreased by washing in acetone and blasted with #80 alumina grit. A single coat was applied to each specimen. The resulting coatings were cured at 700° F. (371° C.) for 30 minutes and then cooled to room temperature. The coating thickness was determined to be about 1 mil (0.03 mm).

Each cooled, primed coupon was then electrostatically sprayed with a PPS powder having a particle size less than 60 mesh and a nominal melt flow of about 1,000. Admixed with the PPS was about 1.3 wt. % finely divided silica as a fluidizing agent. A single pass was employed to obtain a coating thickness averaging about 3 to 5 mils (0.08 to 0.13 mm) after curing. The coated slugs had a cured coating thickness averaging to 1 to 4 mils (0.03–0.10 mm). The resulting coatings were cured at 700° F. for 45 minutes than cooled to room temperature. The coated samples prepared in this fashion were all invention samples.

Control samples were prepared by electrostatically coating cleaned and grit blasted steel coupons and slugs, in the absence of the primer of this invention, with the PPS powder composition as described before. As before, the coatings were cured at 700° F. for 45 minutes and then cooled to room temperature.

The adhesion of the applied coatings to the surfaces of the samples was determined by immersing the samples in boiling water, periodically removing a sample, cutting through the coating to the metal with a sharp knife and attempting to pry the coating loose with the knife. A low power microscope at 10–20 magnification was used to observe the effect of prying. Based on the observations made the adhesion of each sample was determined to be good, fair or poor using the following arbitrary rating definitions:

Good—no peeling.

Fair—very little peeling before breaking. Can be observed microscopically.

Poor—more peeling than the fair rating.

With all the control samples, the adhesion was rated to be poor after only 2 hours immersion in boiling water.

With invention samples, specimens were removed after 21 hours, 40 hours, 1 week, 2 weeks, 4 weeks and 6 weeks and adhesion determined by cutting through the coatings and rating the results. All samples were rated good after 6 weeks. The cut samples were again immersed in the boiling water, left there for 2 more weeks, removed and attempts were made to try to pry the coatings loose. The ratings of the coated slugs were still determined to be good and the ratings of the coupons were determined to range from fair to good.

The results conclusively demonstrate the efficacy of the invention primer composition in improving the adhesion of PPS coatings to steel.

I claim:

1. A coated article comprising:
   a metal substrate,
   a cured first coating adhered to said metal substrate comprising poly(arylene sulfide) and an effective amount ranging from about 5 to 70 weight percent of said first coating of manganese dioxide suitable for improving adhesion of poly(arylene sulfide) to said substrate, and
   a cured finish coating comprising poly(arylene sulfide) applied to said first coating.

2. An article according to claim 1 wherein manganese dioxide is in finely divided form having a particle size ranging from about 40 to less than 100 mesh.

3. An article according to claim 1 wherein the first coatinc am the finish coating is poly(phenylene sulfide).

4. An iron-containing substrate coated with superposed layers of
   (a) at least one layer of poly(arylene sulfide) containing from about 5 to about 70 weight percent manganese dioxide bonded to said substrate and
   (b) at least one layer of a poly(arylene sulfide) resin bonded to a layer of (a).

5. An article according to claim 4 wherein the thickness of each layer of (a) is about 0.1 to about 5 mils, and (b) is about 1 mil to about 30 mils.

6. An article according to claim 4 wherein the poly(arylene sulfide) in (a) and (b) is poly(phenylene sulfide).

7. An article according to claim 4 wherein (b) contains at least one filler and/or pigment.

8. An arylene sulfide polymer coated structure comprising
   (a) an iron-containing substrate having bonded thereto
   (b) a layer of poly(arylene sulfide) containing from about 30 to about 60 weight percent finely divided manganese dioxide and
   (c) a layer of poly(arylene sulfide) cured and bonded to said layer (b).

9. An article according to claim 8 wherein (a) is a layer of about 0.1 mil to about 5 mils and (b) is a layer of about 1 mil to about 30 mils.

10. An article according to claim 8 wherein said poly(arylene sulfide) in (b) and (c) is poly(phenylene sulfide).

11. A method for coating an iron-containing surface with a poly(arylene sulfide) coating comprising
    applying to said surface a first coating composition comprising poly(arylene sulfide) and an effective amount ranging from about 5 to 70 weight percent of finely divided manganese dioxide for improving adhesion on said surface,
    heating the thus coated iron-containing surface to cure said first coating composition,
    applying a second coating composition comprising poly(arylene sulfide) to the cured first coating composition and
    curing said second coating composition.

12. A method according to claim 11 wherein the concentration of manganese dioxide in said coating composition ranges from about 30 to about 60 weight percent.

13. A method according to claim 11 wherein said second coating composition additionally contains at least one filler and/or pigment.

14. A method according to claim 11 wherein the poly(arylene sulfide) in both coatings is poly(phenylene sulfide).

* * * * *